UNITED STATES PATENT OFFICE.

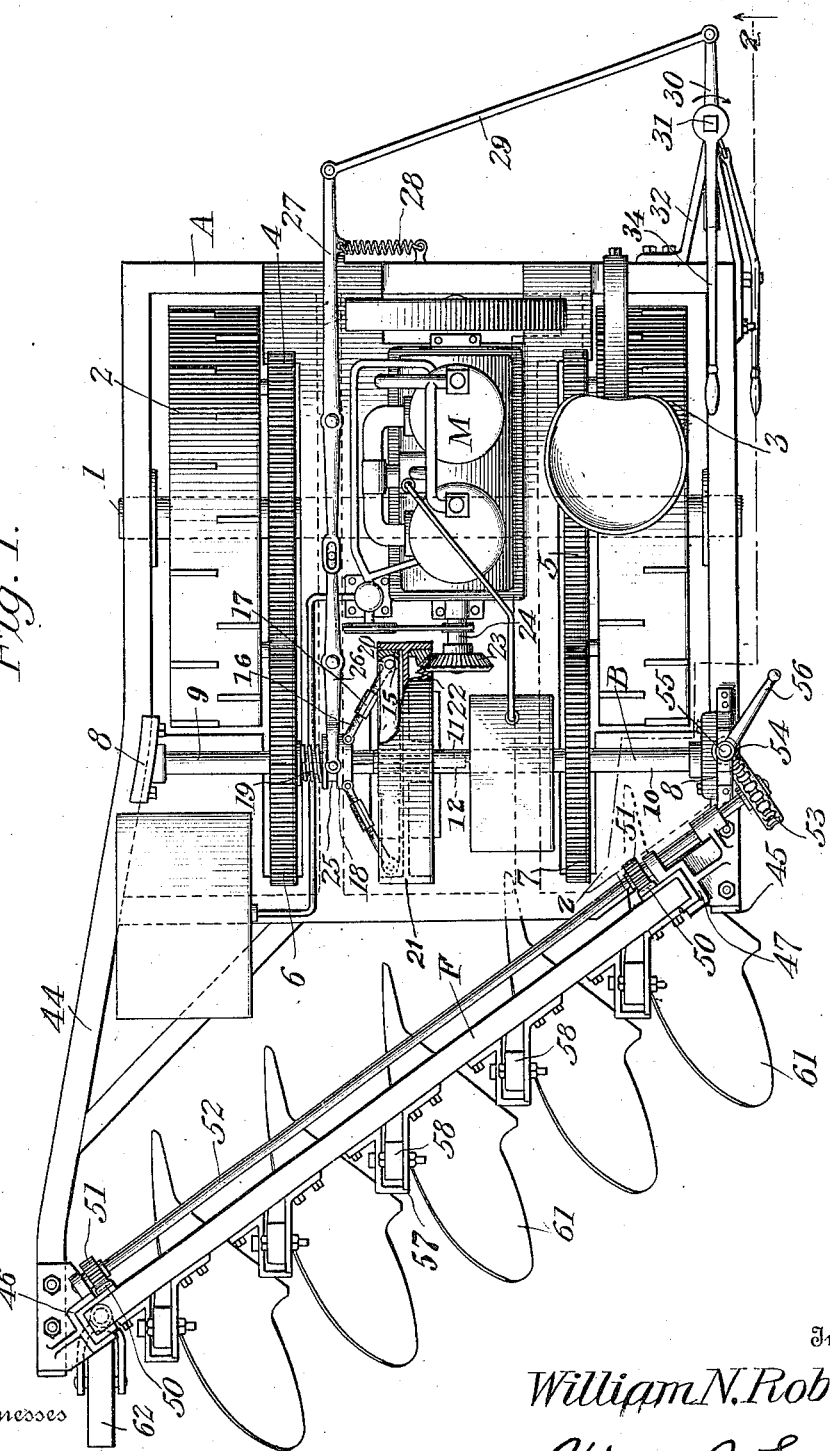

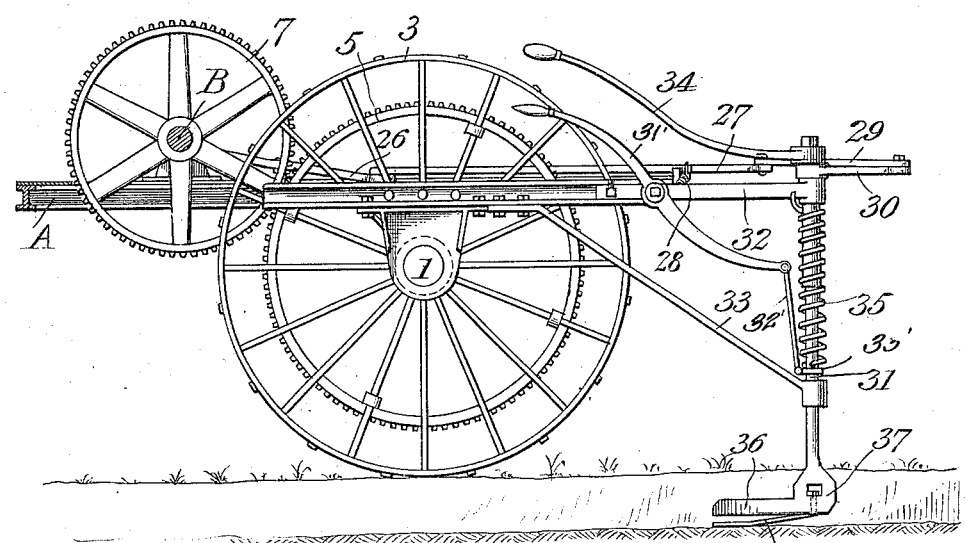

WILLIAM N. ROBISON, OF CANYON, TEXAS, ASSIGNOR OF ONE-HALF TO BEN Y. CHAMBLESS, OF CANYON, TEXAS.

MOTOR-PLOW.

1,068,366.  Specification of Letters Patent.  Patented July 22, 1913.

Application filed November 19, 1910. Serial No. 593,172.

*To all whom it may concern:*

Be it known that I, WILLIAM N. ROBISON, a citizen of the United States of America, residing at Canyon city, in the county of Randall and State of Texas, have invented new and useful Improvements in Motor-Plows, of which the following is a specification.

This invention relates to gang plows of that kind which are driven or propelled by mechanical power, such as a gasolene engine or an internal combustion engine of any suitable type, or by any other well known form of motor.

One object of the invention is to provide a simple and effective steering device consisting of a shoe adapted to travel in the furrow nearest the land, said shoe being adapted to follow the furrow and the turns thereof, and the said shoe being further adapted at each turn of the furrow to swing in a horizontal plane, thus transmitting motion to and actuating a clutch mechanism, whereby the traction wheel of the device distant from the furrow will be thrown out of gear so as to constitute a pivot upon which the entire machine will turn until the steering shoe again assumes a position in longitudinal alinement with the machine, thus resetting the clutch and causing the machine to proceed as before.

A further object of the invention is to provide a steering shoe of simple and improved construction, whereby the object above set forth may be effectively attained.

Still further objects of the invention are to simplify and improve the general construction and operation of a machine of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a traction gang plow constructed in accordance with the invention. Fig. 2 is a longitudinal sectional elevation on the line 2—2 in Fig. 1. Fig. 3 is a detail plan view of the clutch operating mechanism. Fig. 4 is a perspective detail view of the steering shoe. Fig. 5 is a side elevation illustrating a modified form of the steering shoe. Fig. 6 is top plan view of the modified form of the steering shoe, the shaft carrying said shoe being shown in section.

Corresponding parts in the several figures are denoted by like characters of reference.

The frame A of the improved plow is mounted on an axle 1 upon which the transporting wheels 2, 3 are mounted for rotation. Both wheels are traction wheels, and both are intended to travel upon the unplowed land, the wheel 3 traveling adjacent to the furrow turned by the preceding round, and said wheel may, therefore, be designated as the furrow wheel, while the wheel 2 may properly be designated as the land wheel. Suitably connected with the wheels 2 and 3 adjacent to the inner faces of said wheels are gear wheels 4 and 5 meshing with spur wheels 6 and 7 upon a line shaft B which is supported upon uprights or brackets 8 rising from the side members of the frame, said line shaft being in parallel relation to the axle 1. The line shaft B is made up of two parts or sections 9 and 10, the latter having a socket 11 to receive a spindle 12 projecting from the end of the shaft section 9, said shaft sections being thus capable of rotation independently of one another.

The shaft section 9 which carries the gear wheel 6 meshing with the spur wheel 4 upon the land wheel 2 also carries a friction clutch device including a slidable spring pressed collar 18, links 16 having turn buckles 17, and friction shoes 15 engaging the friction rim 20 of a wheel 21 which is firmly keyed and secured upon the shaft section 10, said wheel 21 being also equipped with an internal bevel gear 22 meshing with a pinion 23 upon the driven shaft 24 of a motor M which is suitably supported upon the bed or platform of the machine.

The slidable collar 18 has an annular groove 25 engaged by the fork of a shipping lever 26 which may be thrown by means of a secondary lever 27 for the purpose of moving the collar 18 against the tension of the spring 19 in order to disengage the friction shoes 15 from the rim 20. The auxiliary lever 27 operates against the tension of a spring 28 which assists in restoring said lever 27 to its initial position after being displaced. The lever 27 is connected by means of a rigid link or rod 29 with an arm 30 extending from a vertical shaft 31 which is supported in suitable bearings such as brackets 32, 33 connected with the frame of the machine. The upper extremity of the shaft 31 carries a hand lever 34 which may be readily removed when desired, as indicated in Fig. 3. Upon the shaft 31 is coiled a spring 35, one end of the spring being connected with said shaft, and the other end being connected with the bracket 32, the tension of the spring being exerted to throw said shaft in the direction of the arrows in Figs. 1 and 3. The shaft 31 carries at its lower end a steering shoe 36 which may be described as consisting of an arm extending rearwardly from the shaft and having an enlarged portion or head 37 provided with a transverse slot 38 which is connected by an aperture 39 with the underside of the shoe, which is provided with a groove or channel 40 extending rearwardly from said aperture. A guiding spring 41, which is partly accommodated in the groove 40 and from which it extends rearwardly, as shown in Fig. 4, is provided at its forward end with an upturned arm 42 extending through the aperture 39 and secured by a nut 43 within the recess 38. The spring 41 may be described as a guide spring which by direct contact with the soil serves to maintain the steering shoe 36 against accidental displacement, said guiding spring serving also to some extent to protect the steering shoe from wear, said spring being easily and inexpensively renewed when worn.

In order to enable the steering shoe 36 to be raised from contact with the ground when desired, it is preferred to mount upon the frame of the machine a hand lever 31', one end of which is connected by a link 32' with a collar 33' loosely fitted upon the shaft 31 beneath the spring 35 which, as previously stated, is firmly connected with said shaft. It will be seen that by depressing the handle end of the lever 31' the shaft 31 carrying the steering shoe may be raised or elevated against the tension of the spring 35. Means may be provided for securing the hand lever 31' in adjusted position when the steering shoe is raised or elevated, but such means being common and well known, it has not been considered necessary to particularly illustrate the same.

The plow frame includes rearwardly extending arms 44 and 45 of unequal length, said arms being provided with castings affording guides 46 and 47 for the plow carrying frame F which is vertically movable in said guides. The frame F is provided with vertically disposed rack bars 50, said rack bars meshing with pinions 51 upon a shaft 52 which is supported for rotation in bearings upon the castings which include the guide members 46, 47. The shaft 52 also carries a worm wheel 53 connected with a worm 54 upon a vertically disposed shaft 55 having a crank or handle 56 whereby it may be readily manipulated to rotate the shaft 52 for the purpose of affording vertical adjustment of the plow carrying frame. The said frame is provided with brackets 57 wherein plow carrying beams 58 are supported. A trailing wheel 62 may be suitably connected with the plow carrying frame, as indicated in Fig. 1 of the drawings.

From the foregoing description, taken in connection with the accompanying drawings, the operation and advantages of this invention will be readily understood by those skilled in the art to which it appertains. In laying off the land or plowing the first furrow (or series of furrows, according to the number of plows employed) the machine may be guided by the handle 34, the steering shoe being held in contact with the soil by the spring 35 which exerts a downward as well as a torsional tension, and the handle 34 being held by the operator to maintain the steering shoe in the proper position to guide the plow. When a corner is to be turned, it is obvious that the handle is manipulated to turn the shoe so as to guide the machine in the proper direction. After the land has been laid out, that is to say, after the first round has been plowed, said steering shoe is permitted to drop into the last furrow where it will be held in engagement with the side wall of such furrow by the torsional tension of the spring 35 and in engagement with the bottom of said furrow by the downward tension of said spring. The handle 34 may now be removed from the shaft 31 and the machine is permitted to proceed. The steering shoe will follow the furrow and will thus be automatically adjusted to guide the machine as it progresses. When the steering shaft 31 is oscillated, motion will be transmitted through the arm 30 and rod 29 to the lever 27 and the shipping lever 26, the latter serving to throw the friction shoes 15 out of engagement with the friction rim 20. Motion will thus be transmitted from the motor to the shaft section 10 only, the shaft section 9 and the traction wheel 2 driven from said shaft section remaining temporarily idle, so that said traction wheel will constitute a pivot upon which the machine will turn, the traction wheel 3 being continuously driven from the shaft section 10 to which motion is uninterruptedly transmitted from the machine. As soon as the turn has been completed and the steering shoe assumes its normal longitudinal position, the springs 19 and 28 will serve to restore the parts including the friction mechanism to normal or active position. The plows may be vertically adjusted to plow deep or shallow, as may be desired, and they may be elevated above the ground for transportation when desired.

In Figs. 5 and 6 there has been shown a slightly modified form of steering shoe. Said shoe, which is here designated S, is carried by the shaft 31, and said shoe is of approximately triangular shape, the base 90 of the triangle being of a width equal to the width of the furrow which is to be engaged by the shoe. The shoe is equipped with a guide spring 41' which is in all respects similar to the guide spring 41 hereinbefore described. It will be observed that when the point of the shoe strikes the side wall of the furrow, the point only will be displaced laterally and will follow the side wall of the furrow, being thereby guided while the base of the shoe is prevented from lateral displacement, owing to its width which equals the width of the furrow.

The modified form of the steering shoe shown in Figs. 5 and 6 will usually be found preferable, but no limitation is made to the particular form or shape of said shoe.

Having thus described the invention, what is claimed as new, is:—

1. In a motor driven plow, a vertical steering shaft, a spring connected with said shaft to rock it about its axis and to force it in a downward direction, a furrow engaging steering shoe upon the shaft, and a ground engaging guide spring connected with the steering shoe.

2. In a device of the character described, a shaft supported for oscillation and for vertical movement, a torsion spring connected with the shaft to force it in a downward direction, and to turn it about its axis and a furrow engaging steering shoe upon the shaft.

3. In a device of the character described, a frame, motor driven traction wheels supporting said frame, a steering device including an approximately vertical shaft supported for oscillation and for slidable movement, a torsion spring connected with the shaft and serving to force it in a downward direction and to turn it about its axis, a furrow engaging steering shoe upon the shaft, and means connected with said shaft for cutting out transmission of motion to one of the traction wheels when the shaft is oscillated against the tension of the spring.

4. In a motor driven plow, a vertical steering shaft, a spring connected with said shaft to rock it about its axis and to force it in a downward direction, and a furrow engaging steering shoe upon the shaft, said shoe being of approximately triangular shape with a rearwardly extending base which is of a width approximately equal to the width of the furrow.

In testimony whereof I affix my signature in presence of two witnesses.

WILLIAM N. ROBISON.

Witnesses:
 J. H. STEPHENSON,
 GEO. A. BRANDON.

---

Copies of this patent may be obtained for five cents each, by addressing the "Commissioner of Patents, Washington, D. C."